(12) United States Patent
Yoshinaga et al.

(10) Patent No.: US 10,994,364 B2
(45) Date of Patent: May 4, 2021

(54) SPOT WELDED JOINT AND SPOT WELDING METHOD

(71) Applicant: NIPPON STEEL & SUMITOMO METAL CORPORATION, Tokyo (JP)

(72) Inventors: Chisato Yoshinaga, Tokyo (JP); Seiji Furusako, Tokyo (JP); Fuminori Watanabe, Tokyo (JP); Yasunobu Miyazaki, Tokyo (JP); Tohru Okada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 386 days.

(21) Appl. No.: 15/768,039

(22) PCT Filed: Oct. 16, 2015

(86) PCT No.: PCT/JP2015/079368
§ 371 (c)(1),
(2) Date: Apr. 13, 2018

(87) PCT Pub. No.: WO2017/064817
PCT Pub. Date: Apr. 20, 2017

(65) Prior Publication Data
US 2018/0304396 A1    Oct. 25, 2018

(51) Int. Cl.
*B23K 11/11* (2006.01)
*B23K 11/16* (2006.01)
(Continued)

(52) U.S. Cl.
CPC .......... *B23K 11/11* (2013.01); *B23K 11/0026* (2013.01); *B23K 11/16* (2013.01);
(Continued)

(58) Field of Classification Search
CPC ..... B23K 11/115; B23K 11/16; B23K 11/166; B23K 2101/18; B23K 2101/34;
(Continued)

(56) References Cited

U.S. PATENT DOCUMENTS

2010/0310897 A1* 12/2010 Takaki ................ B62D 29/007
428/586
2011/0008648 A1*  1/2011 Okitsu ................. C22C 38/001
428/683

(Continued)

FOREIGN PATENT DOCUMENTS

JP    2002-103048 A    4/2002
JP    2002-194485 A    7/2002
(Continued)

OTHER PUBLICATIONS

Japanese Office Action for Japanese Application No. 2017-545074, dated May 28, 2019, with English translation.
(Continued)

*Primary Examiner* — Tu B Hoang
*Assistant Examiner* — Vy T Nguyen
(74) *Attorney, Agent, or Firm* — Birch, Stewart, Kolasch & Birch, LLP

(57) ABSTRACT

A spot welded joint in which a high CTS is obtained even if including one or more high strength steel sheets and a method of welding of the same, that is, a spot welded joint 1 including a plurality of steel sheets, wherein one or more steel sheets is a tensile strength 750 to 2500 MPa high strength steel sheet and, at a cross-section in the sheet thickness direction of the steel sheets, when defining superposed surfaces of a high strength steel sheet S1 arranged at an outermost side and another steel sheet 1B as the "plane A" and defining a plane passing through a point of one-half of a distance between a nugget end position E of a high
(Continued)

strength steel sheet S1 side on the line L1 in the sheet thickness direction and a crossing point O of the plane A and the line L1 and parallel to the plane A as the "plane B", at a square area SA of sides of 30 μm centered about a crossing point X of a line L2, which is separated by 250 μm to the heat affected zone side from a tangent at any position on a nugget end line NEL sandwiched between the plane A and plane B and parallel to that tangent, and a line L3 vertical to L2 included in a heat affected zone 4 having a high strength steel sheet S1 as a base material, an average value of widths of the blocks formed from lath martensite is 0.5 to 7.0 μm.

4 Claims, 9 Drawing Sheets

(51) Int. Cl.
    *B23K 11/24*    (2006.01)
    *B23K 11/00*    (2006.01)
    *C21D 9/50*     (2006.01)
    *B23K 101/18*   (2006.01)
    *B23K 103/04*   (2006.01)

(52) U.S. Cl.
    CPC ............... *B23K 11/24* (2013.01); *C21D 9/50* (2013.01); *B23K 2101/18* (2018.08); *B23K 2103/04* (2018.08); *C21D 2211/008* (2013.01)

(58) Field of Classification Search
    CPC . B23K 2103/04; B32B 15/011; C22C 38/001; C22C 38/02; C22C 38/04; C22C 38/06; Y10T 428/12347; Y10T 428/12965
    USPC ............................. 219/118; 428/683; 148/504
    See application file for complete search history.

(56) References Cited

U.S. PATENT DOCUMENTS

| | | | |
|---|---|---|---|
| 2012/0141829 A1* | 6/2012 | Oikawa ................. | B32B 15/011 |
| | | | 428/683 |
| 2015/0174688 A1 | 6/2015 | Yoo et al. | |
| 2016/0082543 A1 | 3/2016 | Wakabayashi et al. | |
| 2016/0289786 A1* | 10/2016 | Ishii ...................... | C22C 38/005 |

FOREIGN PATENT DOCUMENTS

| | | |
|---|---|---|
| JP | 2009-125801 A | 6/2009 |
| JP | 2010-059451 A | 3/2010 |
| JP | 2010-115706 A | 5/2010 |
| JP | 2011-005544 A | 1/2011 |
| JP | 2013-078782 A | 5/2013 |
| JP | 2013-103273 A | 5/2013 |
| JP | 2014-180698 A | 9/2014 |
| WO | WO 2011/025015 A1 | 3/2011 |
| WO | WO 2014/196499 A1 | 12/2014 |

OTHER PUBLICATIONS

Indian Office Action for corresponding Indian Application No. 201817015503, dated Feb. 26, 2020.
International Search Report issued in corresponding International Application No. PCT/JP2015/079368 dated Jan. 19, 2016.
Written Opinion of the International Searching Authority issued in corresponding International Application No. PCT/JP2015/079368 dated Jan. 19, 2016.

* cited by examiner

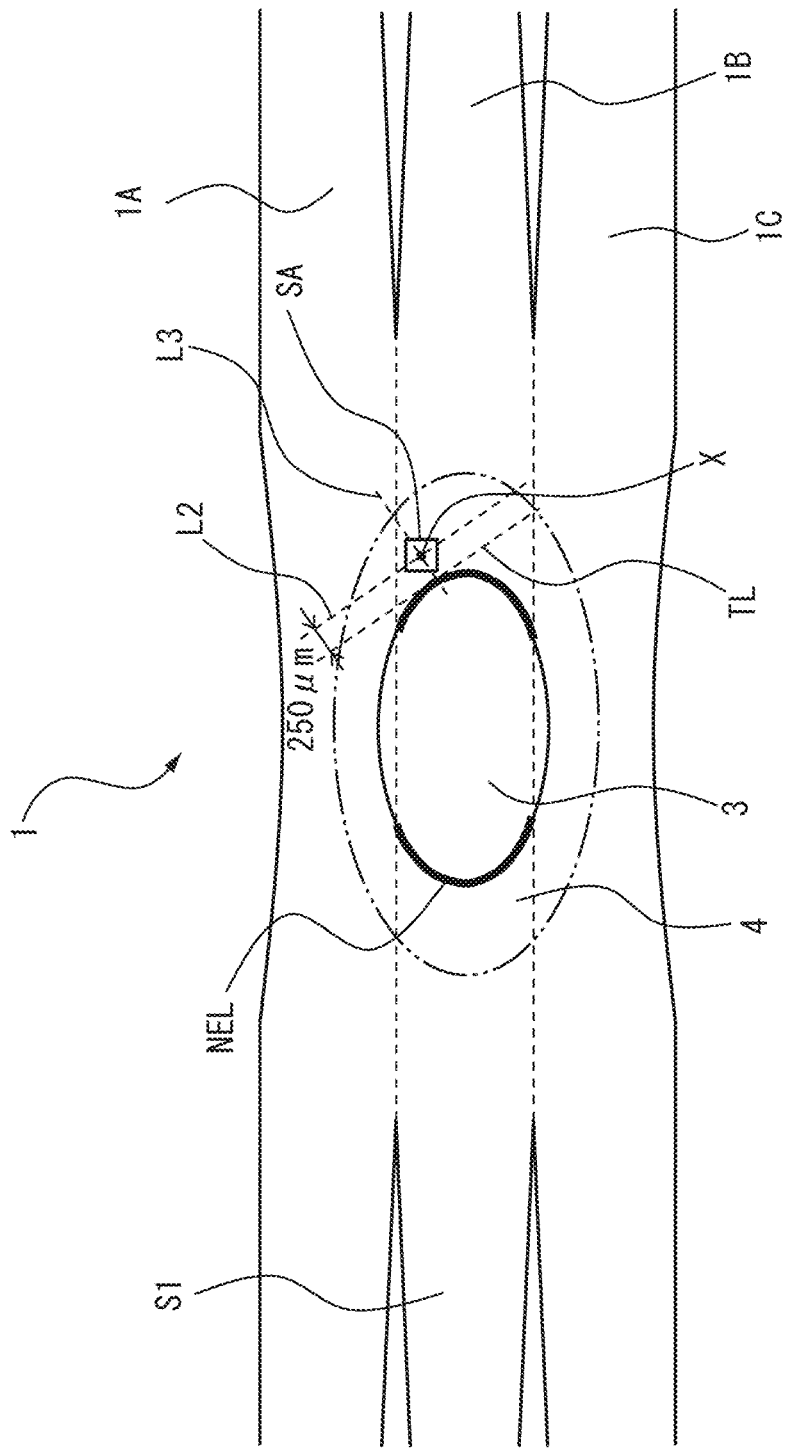

SPOT WELDED JOINT AND SPOT WELDING METHOD

FIELD

The present invention relates to a spot welded joint obtained by superposing and spot welding a plurality of steel sheets and a spot welding method suitable for obtaining that spot welded joint. In particular, it relates to a spot welded joint excellent in tensile strength even when comprised of a plurality of steel sheets including one or more high strength steel sheets and to a spot welding method suitable for obtaining that spot welded joint.

In recent years, in the automotive field, to lower fuel consumption and cut emissions of $CO_2$, reduction of the weight of car bodies has been sought. Further, to improve collision safety, increasing the strength of car body members has been pursued. To satisfy these demands, use of high strength steel sheets for car bodies and their parts etc. is effective. In this regard, when assembling car bodies and attaching parts, spot welded joints formed by superposing and spot welding a plurality of steel sheets have been used.

In a spot welded joint, the tensile strength is an important property. "Tensile strength" includes tensile shear strength (TSS) measured by applying a tensile load in a shear direction and cross tensile strength (CTS) measured by applying a tensile load in a peeling direction. Note that, the methods for measurement of the tensile shear strength and cross tensile strength are prescribed in JIS Z 3136 and JIS Z 3137.

The CTS of a spot welded joint formed by superposing a plurality of steel sheets with tensile strengths which are not that high, for example, steel sheets having 270 MPa to 600 MPa or so tensile strength, increases along with the increase in the tensile strength of the steel sheets forming the joint, so problems seldom arise relating to the tensile strength of the joint.

However, the CTS of a spot welded joint formed by a plurality of steel sheets including at least one steel sheet with a high tensile strength, for example, a steel sheet having 750 MPa or more tensile strength, will not increase even if the tensile strengths of the steel sheets forming the joints increase or else will decrease. The drop in the deformation abilities of the steel sheets and consequent increase in concentration of stress at a weld zone and hardening of the weld zone and consequent drop in toughness of the weld zone are the reasons for this. For this reason, improvement of the CTS at a spot welded joint formed by a plurality of steel sheets including at least one steel sheet with a high tensile strength, that is, a "high strength steel sheet", is being sought.

As the method of securing strength and toughness of a spot welded joint formed including a high strength steel sheet, for example, the methods described in PTLs 1 to 6 may be mentioned.

PTL 1 describes a method of supplying a temper current after a certain time elapses from when a main current for making the steel sheets melt and bond finishes being supplied so as to thereby anneal a bonded zone of the spot welded joint (nugget zone and heat affected zone) and cause the hardness to decrease.

However, with this method, the martensite transformation has to be made to substantially end before supplying the temper current. For this reason, a long cooling time becomes required after the end of the supply of the main current. Furthermore, in the spot welded joint obtained by this method, the nugget is softened so the shear strength falls.

PTL 2 describes a method of tempering a weld zone after welding by a heating means separate from welding, that is, high frequency heating. However, with this method, a separate step becomes required after welding and the work procedure becomes complicated. Further, with this method, special equipment is necessary for utilizing high frequency waves. Still further, in the spot welded joint obtained by this method, the nugget is softened and the shear strength falls.

PTL 3 describes the method of forming a nugget by main welding, then supplying a later current of the main weld current or more. However, with this method, if extending the later current supply time, in the obtained spot welded joint, the nugget size just expands: the structure becomes the same as that of ordinary welding.

PTL 4 describes a method of spot welding steel sheets with a tensile strength of 440 MPa or more. In this method, the chemical composition of the steel sheet is restricted to $C \times P \leq 0.0025$, P: 0.015% or less, and S: 0.01% or less. Further, after welding, the weld zone is heat treated at 300° C. for 20 minutes or so. However, in this method, the steel sheets which can be used are limited. Further, in this method, a long time is required for welding and the productivity is therefore low.

PTL 5 describes a spot welded joint formed including a high strength steel sheet (tensile strength: 750 to 1850 MPa, carbon equivalent Ceq: 0.22 to 0.55 mass %) and defined in microstructure of the outer layer area of the nugget and the average particle size and number density of carbides in the microstructure. However, when fractured at the outside of the nugget, since the structure of the nugget does not contribute to the strength at all, definition of the microstructure is meaningless.

PTL 6 describes a method of spot welding steel sheets with a tensile strength of 900 to 1850 MPa and a sheet thickness of 1.8 to 2.8 mm. In this method, after welding, a current of 0.5 time to 0.9 time the weld current is later supplied for 0.3 time to 0.5 time the weld time. However, in this method, the time between the main welding and the later supply of current is not sufficiently studied. This does not contribute to improvement of the joint strength.

CITATION LIST

Patent Literature

PTL 1: Japanese Patent Publication No. 2002-103048A
PTL 2: Japanese Patent Publication No. 2009-125801A
PTL 3: Japanese Patent Publication No. 2010-115706A
PTL 4: Japanese Patent Publication No. 2010-059451A
PTL 5: WO2011/025015A
PTL 6: Japanese Patent Publication No. 2011-005544A

SUMMARY

Technical Problem

Due to the above such backdrop, in the past, in a spot welded joint formed from a plurality of steel sheets including at least one high strength steel sheet with a high tensile strength, the toughness easily became insufficient and a sufficiently high cross tensile strength was difficult to secure.

The present invention was made in consideration of the above situation and has as its object the provision of a spot welded joint by which a sufficiently high cross tensile strength (CTS) is obtained even if including at least one high strength steel sheet with a high tensile strength, specifically a high strength steel sheet with a tensile strength of 750 MPa to 2500 MPa, and a spot welding method suitable for obtaining that spot welded joint.

Solution to Problem

To solve the above problem, the inventors engaged in intensive studies on a method of solving the above problem from a metallurgical perspective and a mechanical perspective. As a result, they learned that with just securing the toughness of an inside of a melted then solidified part (below, referred to as a "nugget"), at the time of a cross tensile test, even if low load fracture occurring inside the nugget can be suppressed, low load fracture occurring in the surroundings of the nugget, that is, the heat affected zone, cannot be suppressed.

Further, they discovered that to obtain a spot welded joint with a high reliability, it is necessary to improve the structure not only inside of the nugget, but also at the surroundings of the nugget, and that for this, it is possible to control the structure of the heat affected zone surrounding the solidified area after a solidified area is formed in the melted part so as to thereby suppress low load fracture occurring at the heat affected zone, and thereby completed the present invention.

That is, the aspects of the present invention include:
(1) A spot welded joint formed by superposing and spot welding a plurality of steel sheets, wherein
at least one steel sheet of the plurality of steel sheets is a high strength steel sheet with a tensile strength of 750 MPa to 2500 MPa;
a carbon equivalent Ceq of the high strength steel sheet expressed by the following formula (A) is 0.20 mass % to 0.55 mass %;
in the superposing of the plurality of steel sheets, the high strength steel sheet is arranged at an outermost side, the high strength steel sheet arranged at the outermost side being defined as a "high strength steel sheet S1",
in a cross-section cut along the sheet thickness direction of the steel sheet while passing through a center of a welding mark formed on the surface of the steel sheet due to the spot welding,
when defining superposed surfaces of the high strength steel sheet S1 and another steel sheet superposed with that high strength steel sheet S1 as a "plane A" and
when defining a plane passing through a point of one-half of a distance between a crossing point of a line L1 in the sheet thickness direction passing through the center of the nugget and a line showing the end of the nugget at the high strength steel sheet S1 side and a crossing point of the plane A and the line L1 and parallel to the plane A as a "plane B",
a square area, which has sides of 30 μm centered about a crossing point of a line L2 separated from a tangent at any position on a nugget end line NEL sandwiched between the plane A and the plane B in the line showing the end of the nugget by 250 μm to a heat affected zone side and parallel to that tangent and a line L3 passing through that any position and vertical to the line L2, is contained in a heat affected zone having the high strength steel sheet S1 as a base material; and
in the square area, an average value of widths of blocks comprised of lath martensite is 0.5 to 7.0 μm:

$$Ceq=[C]+[Si]/30+[Mn]/20+2[P]+4[S] \quad (A)$$

in formula (A), [C], [Si], [Mn], [P], and [S] respectively being contents of C, Si, Mn, P, and S (mass %).
(2) A spot welded joint formed by superposing and spot welding a plurality of steel sheets, wherein at least one steel sheet of the plurality of steel sheets is a high strength steel sheet with a tensile strength of 750 MPa to 2500 MPa;
a carbon equivalent Ceq of the high strength steel sheet expressed by the following formula (A) is 0.20 mass % to 0.55 mass %;
in the superposing of the plurality of steel sheets, the high strength steel sheet is not arranged at an outermost side, the high strength steel sheet not arranged at the outermost side being defined as a "high strength steel sheet S1",
in a cross-section cut along the sheet thickness direction of the steel sheet while passing through a center of a welding mark formed on the surface of the steel sheet due to the spot welding,
a square area, which has sides of 30 μm centered about a crossing point of a line L2 separated from a tangent at any position on a nugget end line NEL showing the end of the nugget having the high strength steel sheet S1 as a base material in the line showing the end of the nugget by 250 μm to a heat affected zone side and parallel to that tangent and a line L3 passing through that any position and vertical to the line L2, is contained in a heat affected zone having the high strength steel sheet S1 as a base material; and
in the square area, an average value of widths of blocks comprised of lath martensite is 0.5 to 7.0 μm:

$$Ceq=[C]+[Si]/30+[Mn]/20+2[P]+4[S] \quad (A)$$

in formula (A), [C], [Si], [Mn], [P], and [S] respectively being contents of C, Si, Mn, P, and S (mass %).
(3) A spot welding method superposing and spot welding a plurality of steel sheets, wherein
at least one steel sheet of the plurality of steel sheets is a high strength steel sheet with a tensile strength of 750 MPa to 2500 MPa;
a carbon equivalent Ceq of the high strength steel sheet expressed by the following formula (A) is 0.20 mass % to 0.55 mass %; and,
in the superposing of the plurality of steel sheets, the high strength steel sheet is arranged at an outermost side, the high strength steel sheet arranged at the outermost side being defined as a "high strength steel sheet S1",
the method comprising
a main welding step of supplying current to the superposed plurality of steel sheets through welding electrodes and
a heating control step comprising, after the main welding step, maintaining the assembly at a temperature of the Ms point of the high strength steel sheet S1 or more while, in a cross-section cut along the sheet thickness direction of the steel sheet while passing through a center of a welding mark formed on the surface of the steel sheet due to the main welding step,
when defining superposed surfaces of the high strength steel sheet S1 and another steel sheet superposed with that high strength steel sheet S1 as a "plane A" and
when defining a plane passing through a point of one-half of a distance between a crossing point of a line L1 in the sheet thickness direction passing through the center of the part to form a nugget and a line showing the end of the part to form the nugget at the high strength steel sheet S1 side and a crossing point of the plane A and the line L1 and parallel to the plane A as a "plane B",
controlling a square area contained in a heat affected zone having the high strength steel sheet S1 as a base material, which square area has sides of 30 μm centered about a crossing point of a line L2 separated from a tangent at any position on a nugget end line NEL sandwiched between the plane A and the plane B in the line showing the end of the part for forming the nugget by 250 µm to a heat affected zone side and parallel to that tangent and a line L3 passing through that any position and vertical to the line L2, to be heated in a range of an Ar3 point [° C.] of the high strength steel sheet S1 to (Ar3 point+400)[° C.] for 0.04 second to 5.0 seconds:

$$Ceq=[C]+[Si]/30+[Mn]/20+2[P]+4[S] \quad (A)$$

in formula (A), [C], [Si], [Mn], [P], and [S] respectively being contents of C, Si, Mn, P, and S (mass %).

(4) A spot welding method superposing and spot welding a plurality of steel sheets, wherein at least one steel sheet of the plurality of steel sheet is a high strength steel sheet with a tensile strength of 750 MPa to 2500 MPa;

a carbon equivalent Ceq of the high strength steel sheet expressed by the following formula (A) is 0.20 mass % to 0.55 mass %; and in the superposing of the plurality of steel sheets, the high strength steel sheet is not arranged at an outermost side, the high strength steel sheet not arranged at the outermost side being defined as a "high strength steel sheet S1", the method comprising a main welding step of supplying current to the superposed plurality of steel sheets through welding electrodes and a heating control step comprising, after the main welding step, maintaining the assembly at a temperature of the Ms point of the high strength steel sheet S1 or more while, in a cross-section cut along the sheet thickness direction of the steel sheet while passing through a center of a welding mark formed on the surface of the steel sheet due to the main welding step, controlling a square area contained in a heat affected zone having the high strength steel sheet S1 as a base material, which square area has sides of 30 µm centered about a crossing point of a line L2 separated from a tangent at any position on a nugget end line NEL showing the end of the part for forming the nugget having the high strength steel sheet S1 as a base material in the line showing the end of the part for forming the nugget by 250 µm to a heat affected zone side and parallel to that tangent and a line L3 passing through that any position and vertical to the line L2, to be heated in a range of an Ar3 point [° C.] of the high strength steel sheet S1 to (Ar3 point+400)[° C.] for 0.04 second to 5.0 seconds:

$$Ceq=[C]+[Si]/30+[Mn]/20+2[P]+4[S] \quad (A)$$

in formula (A), [C], [Si], [Mn], [P], and [S] respectively being contents of C, Si, Mn, P, and S (mass %).

Advantageous Effects of Invention

According to the present invention, it is possible to provide a spot welded joint by which a sufficiently high cross tensile strength (CTS) is obtained even if including at least one high strength steel sheet with a tensile strength of 750 MPa to 2500 MPa, and a spot welding method suitable for obtaining that spot welded joint.

BRIEF DESCRIPTION OF DRAWINGS

FIG. 3C is a schematic view for explaining a square area for measuring the widths of blocks in a cross-section in a sheet thickness direction of a spot welded joint obtained by superposing three steel sheets in the spot welded joint by according to the present embodiment when a high strength steel sheet is not arranged at an outermost side in that spot welded joint.

DESCRIPTION OF EMBODIMENTS

Figure 1:
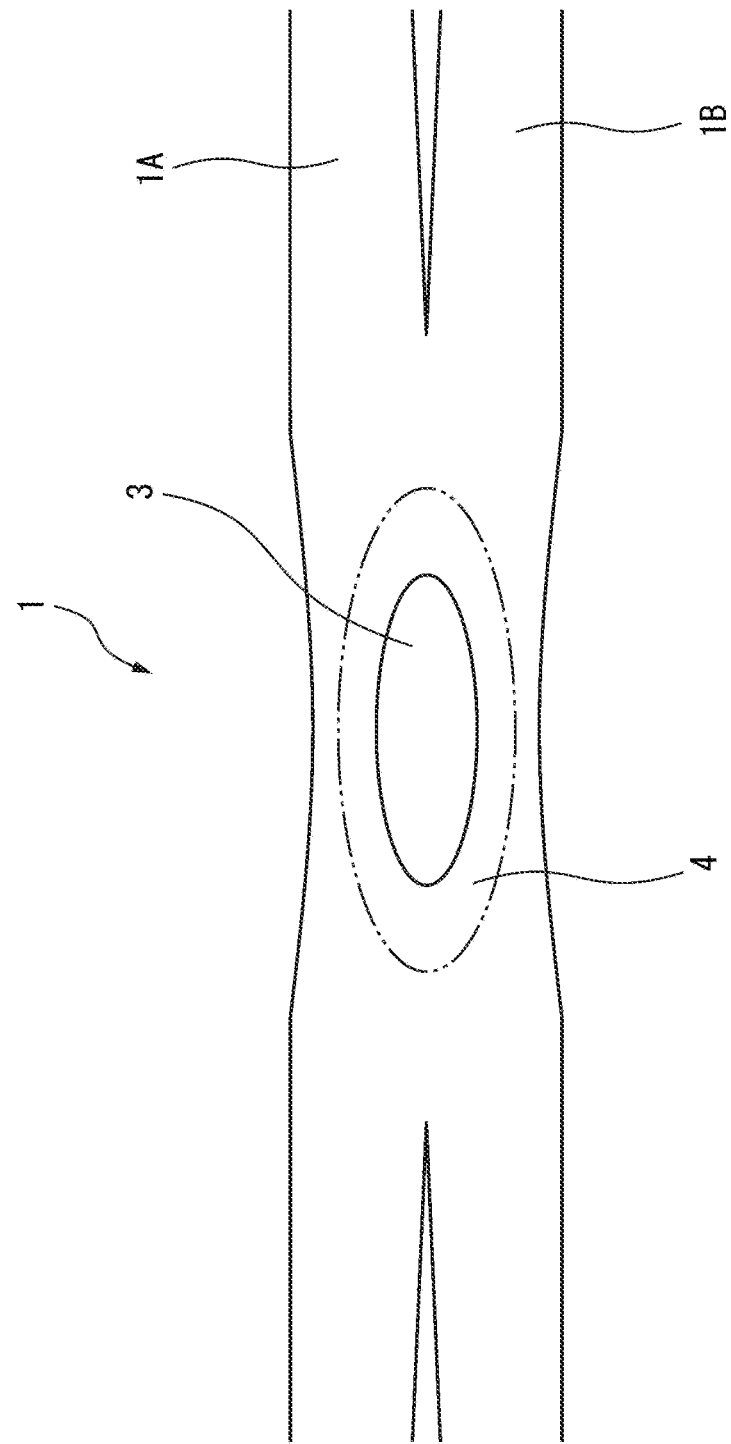
FIG. 1 is a schematic cross-sectional view in a sheet thickness direction of a spot welded joint according to the present embodiment.

Below, the present invention will be explained based on the embodiment shown in the drawings in the following order:
1. Spot Welded Joint
1.1. High Strength Steel Sheets
1.2. Heat Affected Zone
1.3. Steel Sheets Other Than High Strength Steel Sheets
2. Spot Welding Method
2.1. Main Welding Step
2.2. Heating Control Step
3. Effects of Present Embodiment
4. Modifications 1. Spot Welded Joint The spot welded joint 1 according to the present embodiment, as shown in FIG. 1, is comprised of base materials of two steel sheets 1A and 1B superposed and with parts of the superposed parts melted and bonded by spot welding thereby making the steel sheet 1A and steel sheet 1B integrally joined. In the present embodiment, at least one of the steel sheets 1A and 1B is a later explained high strength steel sheet with a high tensile strength.

The plurality of steel sheets forming the spot welded joint according to the present embodiment are not particularly limited so long as the steel sheets include one or more high strength steel sheets. That is, all of the steel sheets forming the spot welded joint may be high strength steel sheets or just one may be a high strength steel sheet.

Further, FIG. 1 shows a spot welded joint obtained by joining two steel sheets, but it may also be a spot welded joint obtained by joining three or more steel sheets. In this case as well, it is sufficient that at least one of the steel sheets be a high strength steel sheet. Further, when superposing three or more steel sheets, the three or more steel sheets may differ in sheet thickness. Further, when superposing three or more steel sheets, at least two steel sheets may be the same in sheet thickness.

Further, the type of the steel sheet is not particularly limited. For example, a dual-phase structure type (for example, structure including martensite in ferrite or structure including bainite in ferrite), work induced transformation type (structure including residual austenite in ferrite), hardened type (martensite structure), fine grain crystal type (mainly ferrite structure), or any other type of steel is possible.

1.1. High Strength Steel Sheet

In the present embodiment, the tensile strength of the high strength steel sheet is 750 MPa to 2500 MPa. As explained above, if forming a spot welded joint including a high strength steel sheet with a high tensile strength, for example, a tensile strength of 750 MPa or more, despite using the high strength steel sheet, the cross tensile strength (CTS) of the spot welded joint ends up decreasing.

If the tensile strength of the high strength steel sheet is less than 750 MPa, basically the cross tensile strength (CTS) is high and, further, the load on the spot welded joint is small. Therefore, few problems arise relating to the joint strength. Accordingly, in the present embodiment, the high strength steel sheet is made a steel sheet having a 750 MPa or more tensile strength where the above-mentioned such problem is manifested.

If the tensile strength of the high strength steel sheet exceeds 2500 MPa, it becomes difficult to suppress a drop and variation in joint strength. Furthermore, along with this, deterioration of the fracture mode at the weld zone and occurrence of defects and cracks inside the nugget become difficult to suppress. Accordingly, the tensile strength of the high strength steel sheet is made 2500 MPa or less.

Carbon Equivalent Ceq

In the present embodiment, the carbon equivalent Ceq of the high strength steel sheet is 0.20 mass % to 0.55 mass % in range. If the carbon equivalent Ceq is less than 0.20 mass %, the lower limit value 750 MPa or more tensile strength of the tensile strength of the above-mentioned high strength steel sheet tends not to be obtainable. On the other hand, if the carbon equivalent Ceq exceeds 0.55 mass %, the tensile strength tends to exceed the upper limit value 2500 MPa of the tensile strength of the above-mentioned high strength steel sheet, so this is not preferable. Note that, the carbon equivalent Ceq is expressed by the following formula (1):

$$Ceq=[C]+[Si]/30+[Mn]/20+2[P]+4[S] \qquad (1)$$

[C], [Si], [Mn], [P], and [S] are respectively the contents of C, Si, Mn, P, and S (mass %).

1.2. Heat Affected Zone

The spot welded joint 1 according to the present embodiment is comprised including such a high strength steel sheet but has excellent tensile strength, in particular, cross tensile strength (CTS).

As shown in FIG. 1, at the joined part of the spot welded joint 1, there is a nugget (melted, then solidified part) 3 formed by melting, then solidification, due to spot welding. Around the nugget, there is a heat affected zone (HAZ) 4 which is heated by the spot welding to the Ac1 point [° C.] to less than the melting temperature and then cooled, resulting in the base materials changing in structure and thereby forming a structure different from the structures of the base materials.

The spot welded joint 1 according to the present embodiment improves the structure of the heat affected zone 4 and suppresses plug fracture occurring at the heat affected zone along with the increase in the tensile strength of the steel sheets forming the base materials to thereby realize improvement of the CTS. Below, the improved structure of the heat affected zone 4 will be explained in detail.

The heat affected zone 4 is formed in the step where current is supplied to the steel sheets 1A and 1B at the time of spot welding where the structures of the base materials are heated by the resistance heat generated due to the supply of current, then are cooled. At the time of this cooling, if the temperature of the heat affected zone 4 falls below the Ms point of the base materials, a martensite structure starts to be formed in the structure of the heat affected zone 4.

Therefore, the structure of the heat affected zone 4 of the spot welded joint 1 after the end of spot welding is mainly comprised of a martensite structure. In the present embodiment, by controlling this martensite structure, the structure of the heat affected zone 4 is improved, fracture at the heat affected zone is suppressed, and improvement of the CTS is realized.

Figure 2:
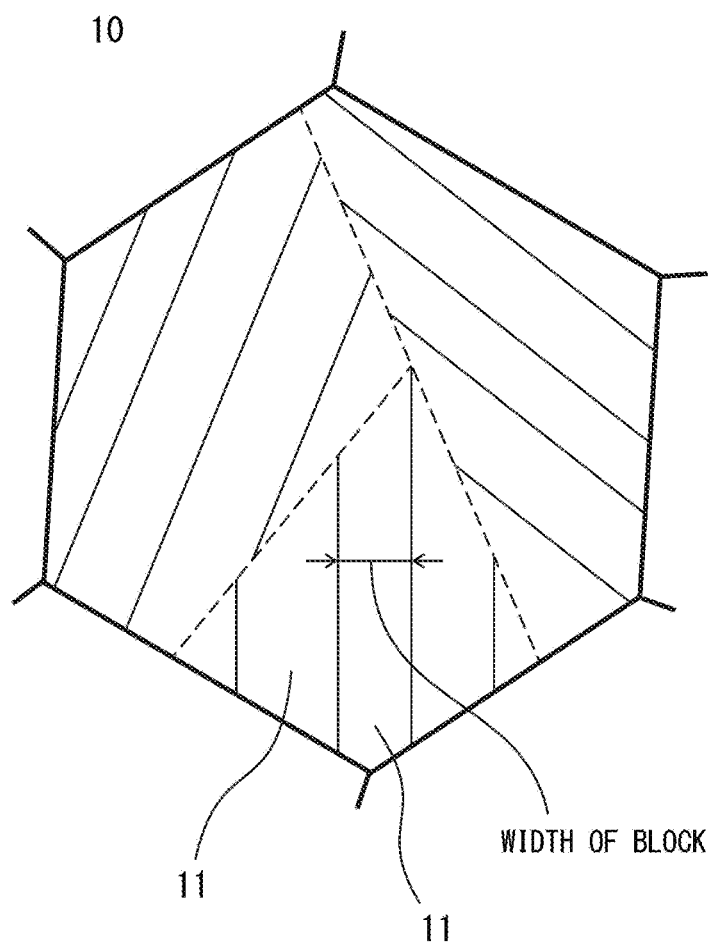
FIG. 2 is a schematic view for explaining blocks in a martensite structure forming a heat affected zone of a spot welded joint according to the present embodiment.

Specifically, in a heat affected zone 4 having a high strength steel sheet as a base material, there is a martensite structure. As shown in FIG. 2, in a martensite structure 10, fine lath martensite having substantially the same crystal orientations gather together to form blocks 11. The blocks 11 have elongated shapes. As a parameter of size of the blocks 11, usually the widths of the blocks 11 (lengths in short side directions) are measured. In the present embodiment, in a specific square area inside the heat affected zone 4, the blocks 11 formed from the lath martensite are relatively large in widths. The average value is 0.5 to 7.0 μm, preferably 2 to 6 μm.

In the present embodiment, the martensite structure of the heat affected zone having a high strength steel sheet as a base material is controlled and the widths of the blocks are increased to the above range to thereby improve the toughness of the heat affected zone 4. As a result, fracture at the heat affected zone is suppressed. Even in a spot welded joint including a high strength steel sheet, the CTS can be improved.

The range of the widths of the blocks does not have to be satisfied in the heat affected zone 4 as a whole. It is sufficient that it be satisfied in a specific square area of the heat affected zone. Therefore, when the widths of the blocks are within the above range, this means that the structure is improved to an extent where the structure of the heat affected zone 4 as a whole can contribute to improvement of the CTS, that is, to an extent where plug fracture at the heat affected zone 4 is suppressed. Note that, the specific square area is determined as follows.

Below, the case where in a spot welded joint comprised of a plurality of steel sheets superposed, a high strength steel sheet is arranged at an outermost side and the case where a high strength steel sheet is not arranged at the outermost side will be explained separately. Usually, fracture occurs from a location including the steel sheet at an outermost side of the spot welded joint. First, the case where a high strength steel sheet is arranged at an outermost side will be explained.

Figure 3A:
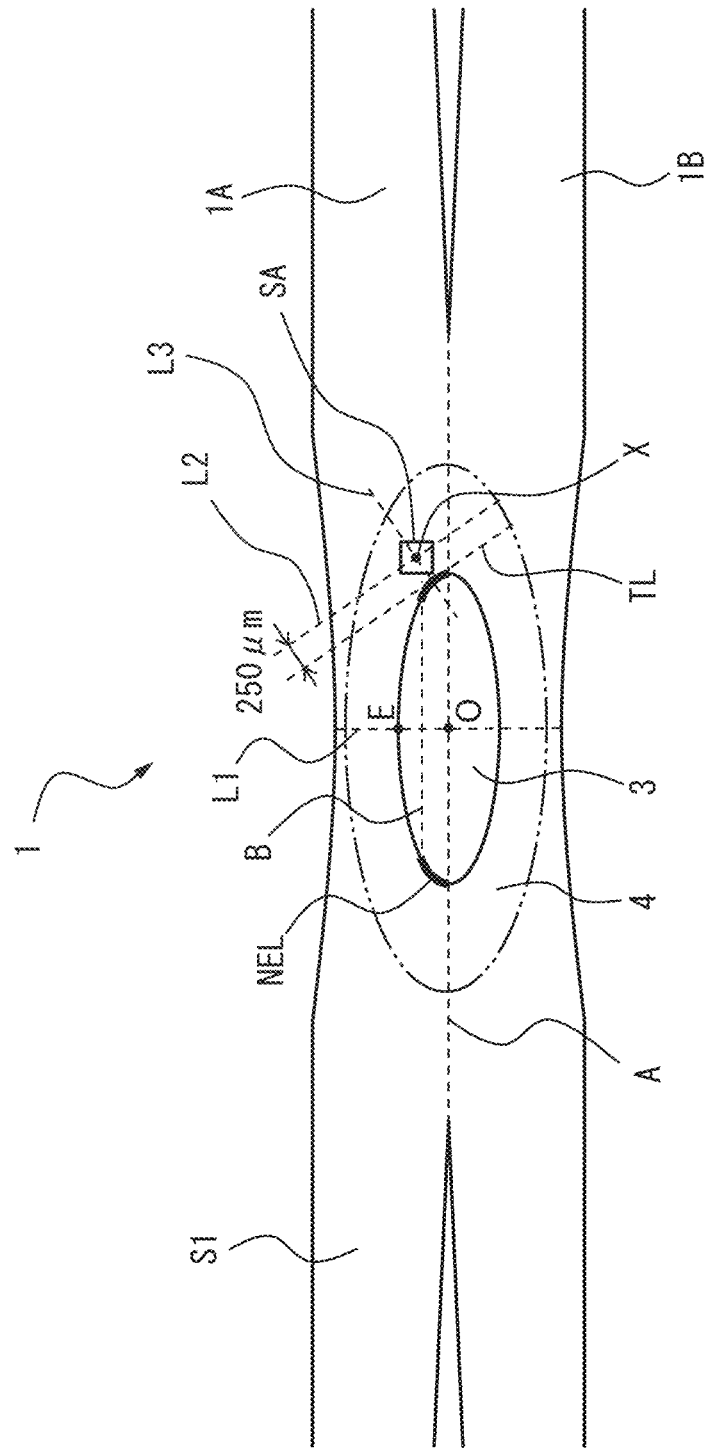
FIG. 3A is a schematic view for explaining a square area for measuring the widths of blocks in a cross-section in a sheet thickness direction of a spot welded joint obtained by superposing two steel sheets in the spot welded joint according to the present embodiment when a high strength steel sheet is arranged at an outermost side in that spot welded joint.

FIG. 3A shows a cross-section in a spot welded joint obtained by superposing two steel sheets which is cut along the sheet thickness direction of the steel sheet while passing through a center of a welding mark able to be seen as a welded part. In FIG. 3A, the steel sheet 1A is the high strength steel sheet S1, while the steel sheet 1B is a steel sheet other than a high strength steel sheet. Further, as clear from FIG. 3A as well, in the present embodiment, in a spot welded joint obtained by superposing two steel sheets, the high strength steel sheet is always arranged at an outermost side.

In this cross-section, the superposed surfaces of the high strength steel sheet S1 and the other steel sheet 1B superposed on that high strength steel sheet S1 are defined as the "plane A". Further, the plane passing through the point of one-half of a distance between the crossing point E between the line L1 in the sheet thickness direction passing through the center O of the nugget O and the line showing the end of the nugget at the high strength steel sheet S1 side and the crossing point of the plane A and the line L1 (in FIG. 3A, the center O of the nugget) and parallel to the plane A is defined as the "plane B". The end of the nugget sandwiched between the plane A and plane B in the line showing the end of the nugget 3 is defined as the "nugget end line NEL". In FIG. 3A, the nugget end line NEL is shown by a bold line.

Assuming a tangent TL at any position on the nugget end line NEL prescribed in this way, the crossing point X between the line L2 separated from this tangent TL to the heat affected zone side by 250 μm and parallel to that tangent TL and the line L3 passing through that any position and vertical to the line L2 is found. Further, the square area SA of sides of 30 μm centered on this crossing point X may be made the area for measurement of the widths of the blocks. This square area is included in the heat affected zone 4 having the high strength steel sheet S1 as a base material.

Next, a spot welded joint obtained by superposing three or more steel sheets wherein a high strength steel sheet is arranged at an outermost side will be explained.

Figure 3B:
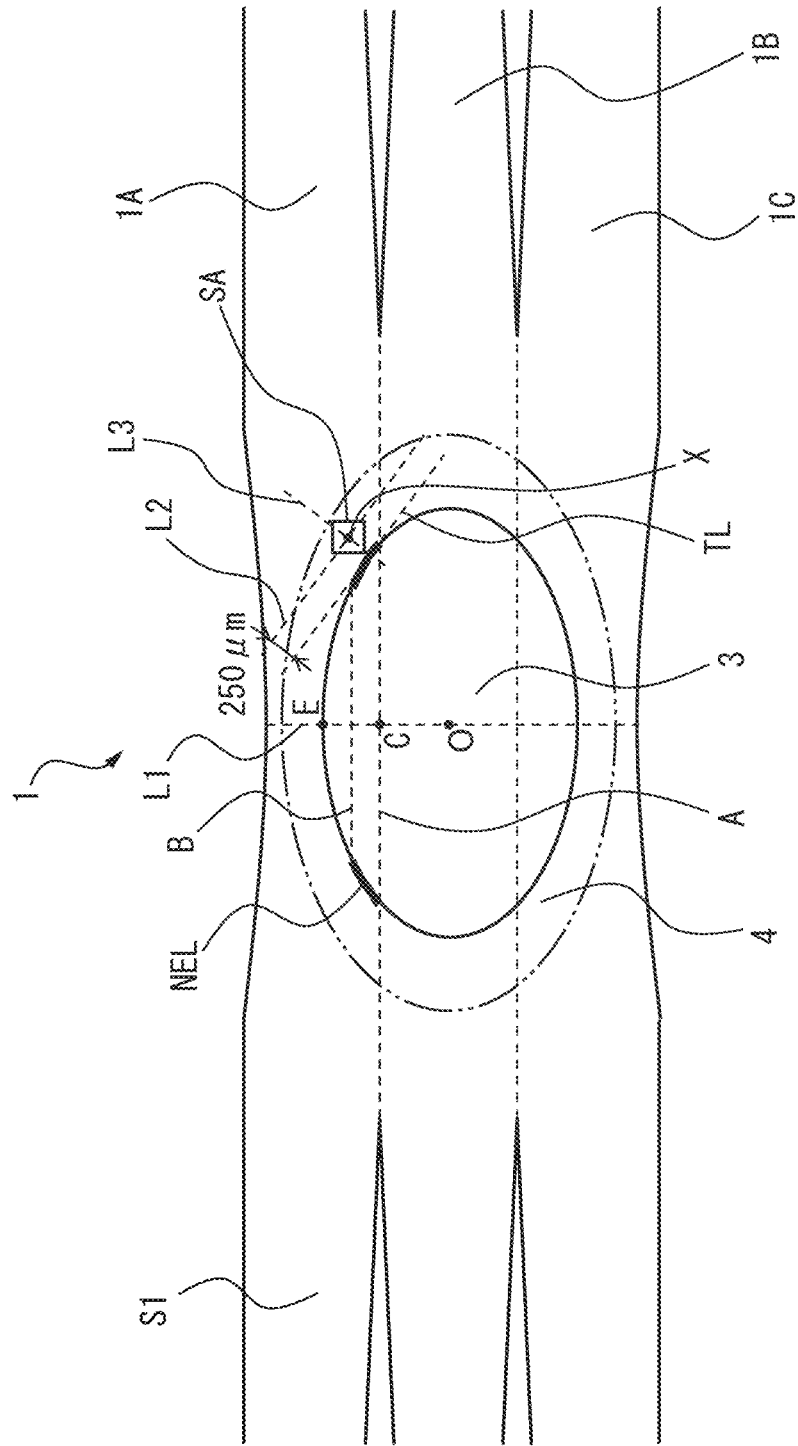
FIG. 3B is a schematic view for explaining a square area for measuring the widths of blocks in a cross-section in a sheet thickness direction of a spot welded joint obtained by superposing three steel sheets in the spot welded joint according to the present embodiment when a high strength steel sheet is arranged at an outermost side in that spot welded joint.

FIG. 3B shows a cross-section of a spot welded joint obtained by superposing three steel sheets which is cut along the sheet thickness direction of the steel sheets while passing through a center of a welding mark able to be seen as a welded part. In FIG. 3B, the steel sheet 1A is the high strength steel sheet S1, while the steel sheets 1B and 1C are steel sheets other than the high strength steel sheet.

In this cross-section, the superposed surfaces of the high strength steel sheet S1 and the other steel sheet 1B superposed with that high strength steel sheet S1 is defined as the "plane A". Further, the plane passing through the point of one-half of the distance between the crossing point E of the line L1 in the sheet thickness direction passing through the center O of the nugget and the end of the nugget at the high strength steel sheet S1 side and the crossing point C of the plane A and the line L1 and parallel to the plane A is defined as the "plane B". In the line showing the end of the nugget 3, the end of the nugget sandwiched between the plane A and plane B is defined as the "nugget end line NEL". In FIG. 3B, the nugget end line NEL is shown by a bold line.

Assuming a tangent TL at any position on the nugget end line NEL prescribed in this way, the crossing point X between the line L2 separated from this tangent TL to the heat affected zone side by 250 μm and the line L3 passing through that any position and vertical to the line L2 is found. Further, the square area SA with sides of 30 μm centered on this crossing point X may be made the area for measuring the widths of the blocks. This square area is contained in the heat affected zone 4 having the high strength steel sheet S1 as a base material.

Next, a spot welded joint obtained by superposing three or more steel sheets wherein a high strength steel sheet is not arranged at an outermost side will be explained.

FIG. 3C shows a cross-section in a spot welded joint obtained by superposing three steel sheets which is cut along the sheet thickness direction of the steel sheet while passing through the center of a welding mark able to be seen as a welded part. In FIG. 3C, the steel sheet 1B is the high strength steel sheet S1, while the steel sheets 1A and 1C are steel sheets other than the high strength steel sheet.

In this cross-section, in the line showing the end of the nugget 3, the end of the nugget having the high strength steel sheet S1 as the base material is shown as the nugget end line NEL. In FIG. 3C, the nugget end line NEL is shown by the bold line. Assuming a tangent TL at any position on this nugget end line NEL, the crossing point X between the line L2 separated from this tangent TL to the heat affected zone side by 250 μm and parallel to that tangent TL and the line L3 passing through that any position and vertical to the line L2 is found. Further, the square area SA of sides of 30 μm centered on this crossing point X may be made the area for measurement of the widths of the blocks. This square area is included in the heat affected zone 4 having the high strength steel sheet S1 as a base material.

Note that, in the square area SA, the width of a block may be measured in the following way. EBSD (Electron Back Scatter Diffraction) patterns of the corresponding portions in the SEM are used to obtain an orientation map. Further, from the K-S relation, the old austenite grain boundaries are judged. The smallest unit with a difference of orientation in the grains of a difference of 15° or more is judged. The size of the narrower width of that shape is defined as the "width of the block".

The high strength steel sheet of the base material of the heat affected zone at which the above width of the block is measured preferably satisfies the following requirements in addition to the above-mentioned tensile strength and carbon equivalent.

Sheet Thickness

The sheet thickness of the high strength steel sheet is not particularly limited, but for example may be the sheet thickness of the high strength steel sheets generally used in car bodies of automobiles etc. (0.5 mm to 3.2 mm) or so. However, along with an increase in the thickness of the high strength steel sheet, the stress concentration around the nugget increases, so the thickness of the high strength steel sheet is preferably 2.6 mm or less.

Chemical Composition

It is sufficient to select a chemical composition enabling the tensile strength of the above-mentioned high strength steel sheet (750 MPa to 2500 MPa) to be secured. The steel member after spot welding is mainly used in the automotive field etc. If considering this, the chemical composition of the high strength steel sheet is preferably the following chemical composition. Note that, below, "%" means mass %.

C: 0.07 Mass % to 0.45 Mass %

C is an element raising the tensile strength of steel. The greater the content of C in the steel, the higher the strength of the nugget can be made. However, if the content of C in the steel is less than 0.07 mass %, a 750 MPa or more tensile strength is difficult to obtain. On the other hand, if the content of C in the steel exceeds 0.45 mass %, the workability of the high strength steel sheet falls. Therefore, the content of C of the high strength steel sheet is preferably 0.07 mass % to 0.45 mass %.

Si: 0.001 Mass % to 2.50 Mass %

Si is an element raising the strength of steel due to solution strengthening and structure strengthening. However, if the content of Si in steel exceeds 2.50 mass %, the workability of the steel falls. On the other hand, reducing the content of Si in the steel industrially to less than 0.001 mass % is technically difficult. Therefore, the content of Si of the high strength steel sheet is preferably 0.001 mass % to 2.50 mass %.

Mn: 0.8 Mass % to 5.0 Mass %

Mn is an element raising the strength of steel. However, if the content of Mn in steel exceeds 5.0 mass %, the workability of the steel falls. On the other hand, if the content of Mn in steel is less than 0.8 mass %, it is difficult to obtain a 750 MPa or more tensile strength. Therefore, the content of Mn of the high strength steel sheet is preferably 0.8 mass % to 5.0 mass %.

P: 0.03 Mass % or Less

P is an element making a nugget brittle. If the content of P in steel exceeds 0.03 mass %, the inside of the nugget easily cracks and it is difficult to obtain a sufficiently high joint strength. Therefore, the content of P of a high strength steel sheet is preferably 0.03 mass % or less. Note that reducing the content of P in steel to less than 0.001 mass % is not preferable cost-wise. Therefore, the content of P of the high strength steel sheet is preferably 0.001 mass % or more. However, the content of P of the high strength steel sheet may also be made less than 0.001 mass %.

S: 0.01 Mass % or Less

S is an element making a nugget brittle. Further, S is an element bonding with Mn to form coarse MnS which obstructs the workability of steel. If the content of S in steel exceeds 0.01 mass %, the inside of the nugget easily cracks and it is difficult to obtain a sufficiently high joint strength. Further, the workability of the steel falls. Therefore, the content of S of the high strength steel sheet is preferably 0.01 mass % or less. Note that reducing the content of S in steel to less than 0.0001 mass % is not preferable cost-wise. Therefore, the content of S of the high strength steel sheet is preferably 0.0001 mass % or more. However, the content of S of the high strength steel sheet may also be made less than 0.0001 mass %.

N: 0.01 Mass % or Less

N is an element forming coarse nitrides and degrading the workability of steel. Further, N is an element causing the formation of blowholes at the time of welding. If the content of N in steel exceeds 0.01 mass %, degradation of the workability of the steel and formation of blowholes become remarkable. Therefore, the content of N of a high strength steel sheet is preferably 0.01 mass % or less. Note that reducing the content of N in steel to less than 0.0005 mass % is not preferable cost-wise. Therefore, the content of N of the high strength steel sheet is preferably 0.0005 mass % or more. However, the content of N of the high strength steel sheet may also be made less than 0.0005 mass %.

O: 0.01 Mass % or Less

O is an element forming oxides and degrading the workability of steel. If the content of O in steel exceeds 0.01 mass %, the deterioration of the workability of steel becomes remarkable. Therefore, the content of O of the high strength steel sheet is preferably 0.01 mass % or less. Note that reducing the content of O in the high strength steel sheet to less than 0.0005 mass % is not preferable cost-wise. Therefore, the content of O of the high strength steel sheet is preferably 0.0005 mass % or more. However, the content of O of the high strength steel sheet may also be made less than 0.0005 mass %.

Al: 1.00 mass % or less

Al is an element stabilizing ferrite and has the effect of suppressing the precipitation of cementite at the time of bainite transformation. For this reason, it is included for control of the steel structure. Further, Al also functions as a deoxidizing material. On the other hand, Al easily oxidizes. If the content of Al exceeds 1.00 mass %, the inclusions increase, whereby the steel easily degrades in workability. Therefore, the content of Al of the high strength steel sheet is preferably 1.00 mass % or less.

The high strength steel sheet may also selectively contain the following elements according to need in addition to the above main elements:

Ti: 0.005 Mass % to 0.20 Mass %
Nb: 0.005 Mass % to 0.20 Mass %
V: 0.005 Mass % to 0.20 Mass %

Ti, Nb, and V are elements which contribute to the rise in strength of steel due to at least one of precipitation strengthening, fine grain strengthening by suppression of growth of ferrite crystal grains, and dislocation strengthening by suppression of recrystallization. However, in each of these elements, if the content in the high strength steel sheet is less than 0.005 mass %, it is difficult for the effect of addition to be manifested. On the other hand, if the content in steel exceeds 0.20 mass %, the workability of steel is obstructed. Therefore, the contents of these elements in the high strength steel sheet are in all cases preferably 0.005 mass % to 0.20 mass %.

B: 0.0001 Mass % to 0.01 Mass %

B is an element controlling the steel structure and strengthening steel. However, if the content of B in steel is less than 0.0001 mass %, it is difficult for the effect of addition to be manifested. On the other hand, if the content of B in steel exceeds 0.01 mass %, the effect of addition become saturated. Therefore, the content of B in the high strength steel sheet is preferably 0.0001 mass % to 0.01 mass %.

Cr: 0.01 Mass % to 2.0 Mass %
Ni: 0.01 Mass % to 2.0 Mass %
Cu: 0.01 Mass % to 2.0 Mass %
Mo: 0.01 Mass % to 0.8 Mass %

Cr, Ni, Cu, and Mo are elements contributing to improvement of the strength of steel. These elements can be used in place of, for example, part of the Mn (strength improving element). However, in each of these elements, if the content in the high strength steel sheet is less than 0.01 mass %, there is no contribution to improvement of strength.

Therefore, the contents of these elements in the high strength steel sheet are in all cases preferably 0.01 mass % or more. On the other hand, if the contents of Cr, Ni, and Cu in steel exceed 2.0 mass % and if the content of Mo in steel exceeds 0.8 mass %, obstacles arise at the time of pickling or at the time of hot working. Therefore, the contents of Cr, Ni, and Cu in the high strength steel sheet is preferably 2.0 mass % or less. Further, the content of Mo in the high strength steel sheet is preferably 0.8 mass % or less.

At Least One Type of Ca, Ce, Mg, and REM (Rare Earth Metal): Total of 0.0001 Mass % to 1.0 Mass %

Ca, Ce, Mg, and REM are elements reducing the size of oxides after deoxidation or the size of sulfides present in hot rolled steel sheet and contributing to improvement of the workability of steel. However, if the contents of these elements in steel is in total less than 0.0001 mass %, it is difficult for the effect of addition to be manifested. On the other hand, if the contents of these elements in steel in total exceeds 1.0 mass %, the workability of the steel falls.

Therefore, the contents of these elements in the high strength steel sheet are preferably in total 0.0001 mass % to 1.0 mass %.

Note that, an REM is an element belonging to the lanthanide series. An REM and Ce can be added to molten steel as mischmetal at the steelmaking stage. Further, in addition to La and Ce, lanthanoid series elements may also be included compositely.

The balance in a high strength steel sheet other than the above elements may be Fe and unavoidable impurities. Note that the above-mentioned Cr, Ni, Cu, Mo, B, Ti, Nb, and V are allowed to be included in trace amounts of less than the above lower limit values as impurities. Further, Ca, Ce, Mg, La, and REM are also allowed to be included in trace amounts of less than the above lower limit values of the total content as impurities.

Plating

A plating layer may also be formed on the surface of the high strength steel sheet. Further, a plating layer may also be formed on the surface of a steel sheet superposed on the high strength steel sheet. As the type of the plating layer, for example, a Zn-based, Zn—Fe-based, Zn—Ni-based, Zn—Al-based, Zn—Mg-based, Pb—Sn-based, Sn—Zn-based, Al—Si-based, or other layer may be mentioned.

As the high strength steel sheet provided with a Zn-based plating layer, for example, a hot dip galvannealed steel sheet, hot dip galvanized steel sheet, electrogalvanized steel sheet, etc. may be mentioned. If a plating layer is formed on the surface of the high strength steel sheet, the spot welded joint exhibits excellent corrosion resistance. When the plating layer is a galvannealed layer on the surface of the high strength steel sheet, an excellent corrosion resistance is obtained and, further, paint adhesion becomes excellent.

The basis weight of the plating layer is not particularly limited. It is preferable to make the basis weight of the plating layer at one surface of the high strength steel sheet 100 $g/m^2$ or less. If the basis weight at one surface of the high strength steel sheet exceeds 100 $g/m^2$, sometimes the plating layer becomes an obstacle at the time of welding. The plating layer may be formed on only one surface of the high strength steel sheet or may be formed on both surfaces. Note that, the surface of the plating layer may be formed with an inorganic or organic film (for example, a lubrication film etc.) etc.

1.3. Steel Sheet Other than High Strength Steel Sheet

The type of a steel sheet superposed with the high strength steel sheet (steel sheet other than the high strength steel sheet) is not particularly limited. It may be a steel type different from the steel type of the high strength steel sheet or may be the same steel type. As a steel sheet other than the high strength steel sheet, for example, a mild steel sheet may be illustrated.

The tensile strength of a steel sheet other than the high strength steel sheet is not particularly limited. In the case of a steel member used in the automotive field etc., the tensile strength may be selected in accordance with the steel member used. For example, the steel sheet may be made one with a tensile strength of less than 750 MPa.

The carbon equivalent Ceq of a steel sheet superposed with the high strength steel sheet is not particularly limited.

The thickness of a steel sheet other than the high strength steel sheet is not particularly limited. The thicknesses of the superposed plurality of steel sheets may also be different from each other. Note that, generally, the thickness of a steel sheet is 6 mm or less.

The chemical composition of a steel sheet other than the high strength steel sheet is not particularly limited. Further, a steel sheet other than the high strength steel sheet may also be plated. The conditions relating to the plating layer are the same as the case of the high strength steel sheet.

2. Spot Welding Method

Below, the optimal spot welding method for obtaining the above spot welded joint will be explained in detail.

The spot welding method according to the present embodiment has a main welding step performed for supplying current between steel sheets and joining the steel sheets and a heating control step performed for controlling the structure of the heat affected zone after the main welding step.

2.1. Main Welding Step

Figure 4:
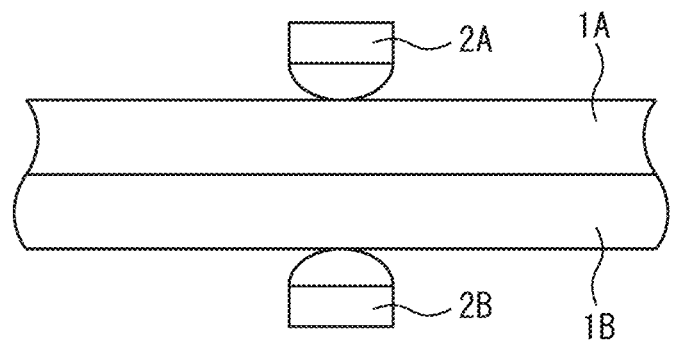
FIG. 4 is a view showing one example of the arrangement of two steel sheets and welding electrodes at the time of starting spot welding.

FIG. 4 is a view showing one example of the arrangement of two steel sheets, including at least one high strength steel sheet, and the welding electrodes when starting spot welding. As shown in FIG. 4, first, the steel sheets 1A and 1B are superposed so that the sheet surfaces face each other. Next, the superposed steel sheets 1A and 1B are sandwiched from above and below by welding electrodes 2A and 2B while supplying current through the welding electrodes 2A and 2B and, if necessary, applying pressure. Due to the resistance heat generated by the supply of current, the parts of the steel sheets 1A and 1B supplied with current melts and the steel sheet 1A and the steel sheet 1B are integrally joined. Right after the main welding ends, the melted part is cooled and the assembly starts to solidify from the outer circumference. When the melted part completely solidifies, the result becomes the nugget 3. Further, around the nugget 3, a heat affected zone 4 with a structure of the base material changed due to the resistance heat is formed. That is, after the main welding ends, the nugget 3 and heat affected zone 4 such as shown in FIG. 1 are formed and the steel sheet 1A and steel sheet 1B are integrally joined. Note that, in the present embodiment, in FIG. 1, one or both of the steel sheets 1A and 1B are the above-mentioned high strength steel sheet.

The welding conditions in the main welding step (weld current value, current supply time (weld time)) are not particularly limited and may be set according to the thicknesses of the steel sheets, the desired nugget size, etc. Further, if applying pressure at the time of welding, the pressing force may also be suitably set in accordance with the welding conditions etc.

Regarding the spot welding equipment, the conventional general spot welding equipment can be used as is. Further, for the welding electrodes etc. as well, the conventional welding electrodes can be used as is. The power supply is not particularly limited. An AC power supply, DC inverter, AC inverter, etc. may be used.

2.2. Heating Control Step

In the present embodiment, a heating control step is performed after the main welding step. In this heating control step, heat treatment supplying heat to the square area shown in FIG. 3A to FIG. 3C to hold it at a temperature within a predetermined temperature range for a predetermined time is performed to control the structure of the heat affected zone 4. At this time, that square area has to be maintained at a temperature over the Ms point of the high strength steel sheet S1 until that heat treatment ends.

Specifically, this heat treatment is treatment for holding the above square area at a temperature over the Ms point of the high strength steel sheet S1 after the end of the main welding while making the time of holding the assembly at a temperature in the range of the Ar3 point [° C.] of the high strength steel sheet S1 to (Ar3+400) [° C.] a total of 0.04 second to 5.0 seconds. Preferably, it heats the assembly to 1000 [° C.] to 1250 [° C.] in range and makes the time holding the assembly in this range a total of 0.04 second to 5.0 seconds. Further, it is preferable to heat the assembly to the Ar3 point [° C.] to the (Ar3 point+400) [° C.] in range and make the time holding the assembly in this range a total of 0.2 second to 2.0 seconds. Furthermore, it is more preferable to heat the assembly to 1050 [° C.] to 1200 [° C.] in range and make the time holding the assembly in this range a total of 0.6 second to 1.0 second. By performing such heat treatment, the martensite structure of the heat affected zone after cooling is controlled and it becomes easy to enlarge the widths of the blocks of groups of lath martensite with the same crystal orientations to the above-mentioned range.

If satisfying the above heat treatment conditions, in the range of the Ar3 point [° C.] to the (Ar3 point+400) [° C.], the temperature may be constant or may fluctuate.

Further, if a temperature of over the Ms point is maintained after the end of the main welding, the temperature of the square area shown in FIG. 3A to FIG. 3C may fall below the Ar3 point until the time of holding the assembly at a temperature inside the range of the Ar3 point [° C.] to (Ar3 point+400) [° C.] becomes a total of 0.04 second to 5.0 seconds.

Furthermore, right after the end of the main welding, it is preferably to hold the assembly at a temperature in the range of the Ar3 point [° C.] to the (Ar3 point+400) [° C.] and make the holding time 0.04 second to 5.0 seconds without allowing that temperature to become outside that range. This is because after the end of the main welding, by holding the assembly at the Ar3 point [° C.] to the (Ar3 point+400) [° C.] without once making the temperature of the square area lower than the Ar3 point [° C.], the block widths can easily be made larger.

Note that, if the temperature of the square area shown in FIG. 3A to FIG. 3C exceeds the (Ar3 point+400) [° C.], there is a possibility of the part of the nugget 3 near the part supplied with current remelting, so the temperature of the square area is preferably not more than the (Ar3 point+400) [° C.].

Figure 5:
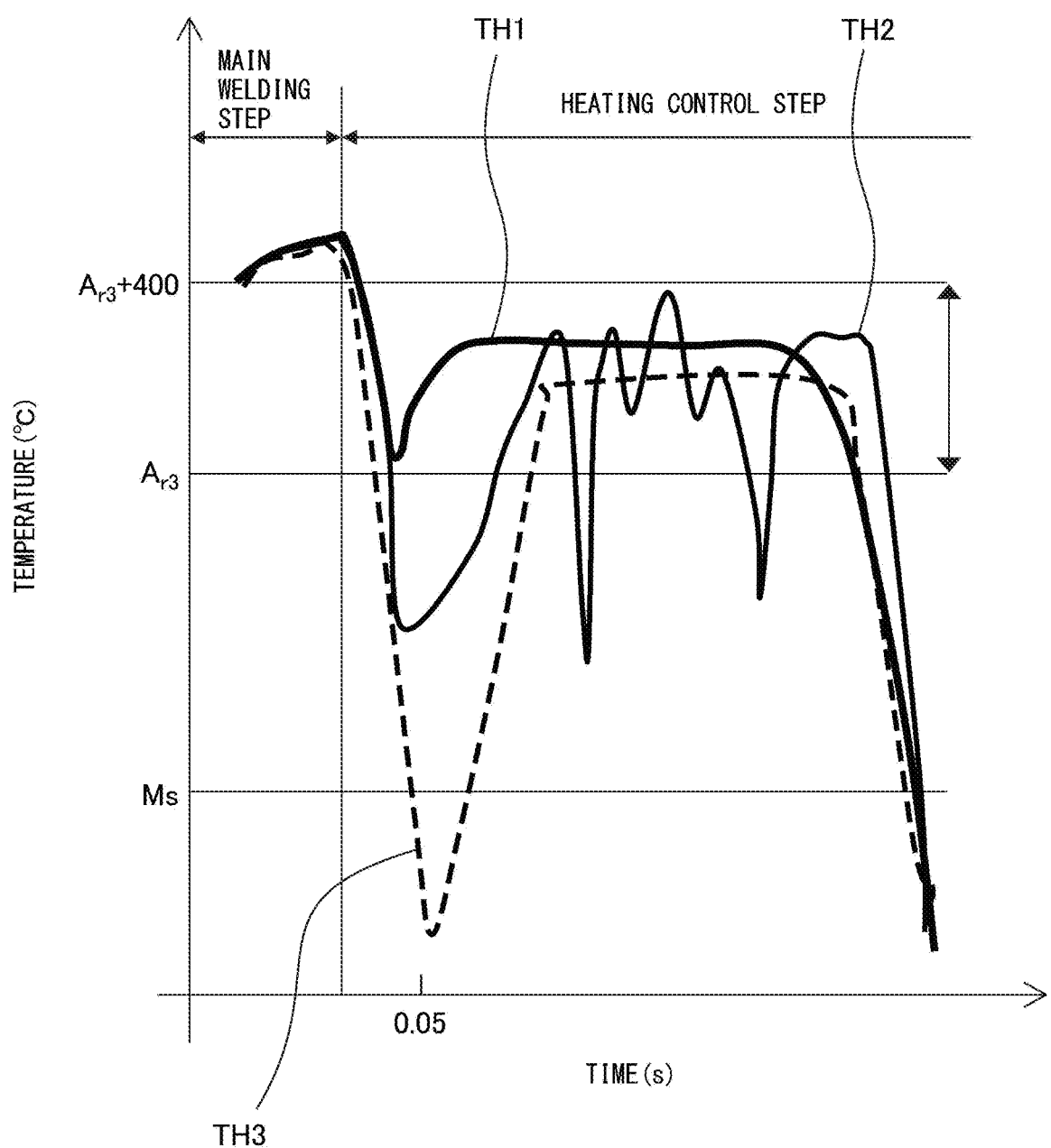
FIG. 5 is a view for explaining temperature histories applied to the square area shown in FIG. 3A to FIG. 3C in a heating control step in a spot welding method according to the present embodiment.

FIG. 5 shows the temperature histories applied to the square area shown in FIG. 3A to FIG. 3C in the heating control step. In FIG. 5, the temperature histories shown by TH1 and TH2 satisfy the above-mentioned heat treatment conditions. The martensite structures after cooling can be controlled and the average values of the widths of the blocks can be made ones within the above range. Note that, in the temperature history shown by TH2, sometimes the temperature becomes lower than the Ar3 point temperature, but it will never become lower than the Ms point temperature until the time for holding the assembly at a temperature in the range of the Ar3 point [° C.] to the (Ar3 point+400) [° C.] becomes a total of 0.04 second to 5.0 seconds. Therefore, the temperature history shown by TH2 satisfies the above-mentioned heat treatment conditions and enables the effects of the present invention to be manifested.

On the other hand, in the temperature history shown by TH3, before the "heat treatment making the time for holding the assembly at a temperature in the range of the Ar3 point [° C.] to (Ar3 point+400) [° C.] a total of 0.04 second to 5.0 seconds" ends, the temperature of the square area falls to a temperature of the Ms point or less, so after that even if satisfying the "heat treatment making the time for holding the assembly at a temperature in the range of the Ar3 point [° C.] to (Ar3 point+400) [° C.] a total of 0.04 second to 5.0 seconds", the desired martensite structure is not obtained.

In the present embodiment, the Ar3 point temperature may be calculated using the following formula (2):

$$Ar3 = 902 - 527[C] - 62[Mn] + 60[Si] \qquad (2)$$

wherein, [C], [Mn], and [Si] respectively are contents (mass %) of carbon, manganese, and silicon.

After the heating control step ends, the joined assembly of the steel sheet 1A and steel sheet 1B is cooled whereby a spot welded joint according to the present embodiment is obtained.

The cooling after the heating control step is not particularly limited, but may be made equal to the cooling in the conventional spot welding method. Note that, after satisfying the above-mentioned heat treatment, the cooling rate down to the Ms point preferably is made a cooling rate where no pearlite transformation or bainite transformation etc. occurs. The cooling rate from the Ms point on is preferably relatively slow.

In the above heating control step, the heating method is not limited so long as a method enabling realization of the above heat treatment. However, in the above heat treatment, after the main welding, from the viewpoint of the need to heat the assembly while maintaining a temperature over the Ms point of the high strength steel sheet S1, ease of temperature control, work efficiency, etc., the heating control step is preferably performed by later supply of current supplying current after the main welding. The conditions for later supply of current should be set so as to satisfy the above heat treatment.

3. Effects of Present Embodiment

In the above embodiment, while a spot welded joint containing one or more high strength steel sheets, by controlling the structure of not only the nugget but also the heat affected zone, it is possible to make the widths of the blocks of the martensite structure within the above range and, as a result, it is possible to suppress low load fracture at the heat affected zone and improve the CTS.

To obtain such a structure, after the main welding, it is sufficient to perform heat treatment holding the temperature of a specific area of the heat affected zone in the above-mentioned range for the above-mentioned time. At this, in the period after the main welding to when the heat treatment ends, the temperature of the square area has to be made a temperature of over the Ms point of the high strength steel sheet. Due to such heat treatment, the widths of the blocks in the martensite structure after cooling become larger and the average value becomes within the above-mentioned range.

4. Modification

In the above-mentioned embodiment, after the main welding step, a heating step is performed, but a pre-current supplying step may be performed before the main welding step as well. By performing the pre-current supplying step, the steel sheet is made to soften and, in the main welding step, the "spattering" occurring due to the inside pressure of the molten metal exceeding the outside pressure acting on the corona bond can be suppressed.

Above, an embodiment of the present invention was explained, but the present invention is not limited in any way to the above-mentioned embodiment and can be changed in various ways within a scope not departing from the gist of the present invention.

Example 1

Below, the present invention will be explained based on more detailed examples, but the present invention is not limited to these examples.

Steel sheets A, B, C, D, E, and F shown in Table 1 were prepared. Note that, the carbon equivalent "Ceq" in Table 1 is the value calculated by the formula (1), while the Ar3 point shown in Table 1 is the value calculated by the formula (2). The steel sheets A to F are steel sheets containing the above-mentioned chemical compositions within the ranges of the above-mentioned upper and lower limits.

TABLE 1

| Steel sheet | Steel type | Tensile strength | Sheet thickness [mm] | Ceq [%] | Ar3 [° C.] | Plating |
|---|---|---|---|---|---|---|
| A | Cold rolled steel sheet | 980 MPa class | 1.6 | 0.41 | 740 | None |
| B | Cold rolled steel sheet | 1180 MPa class | 1.2 | 0.42 | 720 | Zinc type |
| C | Hot rolled steel sheet | 980 MPa class | 2.6 | 0.31 | 820 | None |
| D | Hot stamp | 1470 MPa class | 1.8 | 0.34 | 850 | Aluminum |
| E | Hot stamp | 2000 MPa class | 1.4 | 0.45 | 710 | None |
| F | Cold rolled steel sheet | 270 MPa class | 0.8 | 0.05 | 880 | Zinc type |

In the combinations shown in Table 2, two or three steel sheets were superposed and welded by main welding using a servo gun type welding machine, then the heat treatment shown in Table 2 was performed in the heating control step. The heat treatment, in the same way as the main welding, was controlled using a servo gun type welding machine so that the square area shown in FIG. 3A to FIG. 3C was heated under predetermined conditions.

In the heat treatment of Table 2, if that square area is heated so as to satisfy the temperature range prescribed in the present invention (Ar3 point [° C.] to (Ar3 point+400)[° C.]), "S" is shown in the column of "Temperature range", while if not satisfying it, "NS" is shown. Further, if that square area is heated so as to satisfy the holding time prescribed in the present invention at the predetermined temperature range (0.04 second to 5.0 seconds), "S" is shown in the column of "Holding time", while if not satisfying it, "NS" is shown. If the square area is maintained at the temperature of the Ms point or more after the main welding until the heat treatment is finished, "S" is shown in the column of "Holding at Ms point or more", while if not satisfying it, "NS" is shown. That is, if all of the columns of "Temperature range", "Holding time", and "Holding at Ms point or more" are "S", the joint is in the scope of the present invention, while if even one is "NS", it is outside the scope of the present invention.

The obtained spot welded joint was measured for block widths in the square area shown in FIG. 3A to FIG. 3C and the average value was calculated. The block widths were measured by the above-mentioned method. The measurement results are shown in Table 2.

Further, the method prescribed in JIS Z 3137 was used to measure the CTS (cross tensile strength) of the spot welded joints. In the case of the combination of three or more steel sheet (Sample Nos. 13 to 16 and 20 to 22), for Sample Nos. 13, 14, and 20 to 22, the CTS's at the combinations where fracture easily occurred ("A-B" and "F-B") were measured, while for Sample Nos. 15 and 16, the CTS's of both of "A-F" and "B-F" were measured. The CTS's of the spot welded joints of the same combinations were calculated as the rate of improvement of the CTS with the results of measurement indexed to the CTS of a spot welded joint just welded by main welding and not heat treated (as 100%). The results of measurement are shown in Table 2. In the present examples, a sample with a rate of improvement of the CTS of 150% or more was judged to be good.

Figure 6:
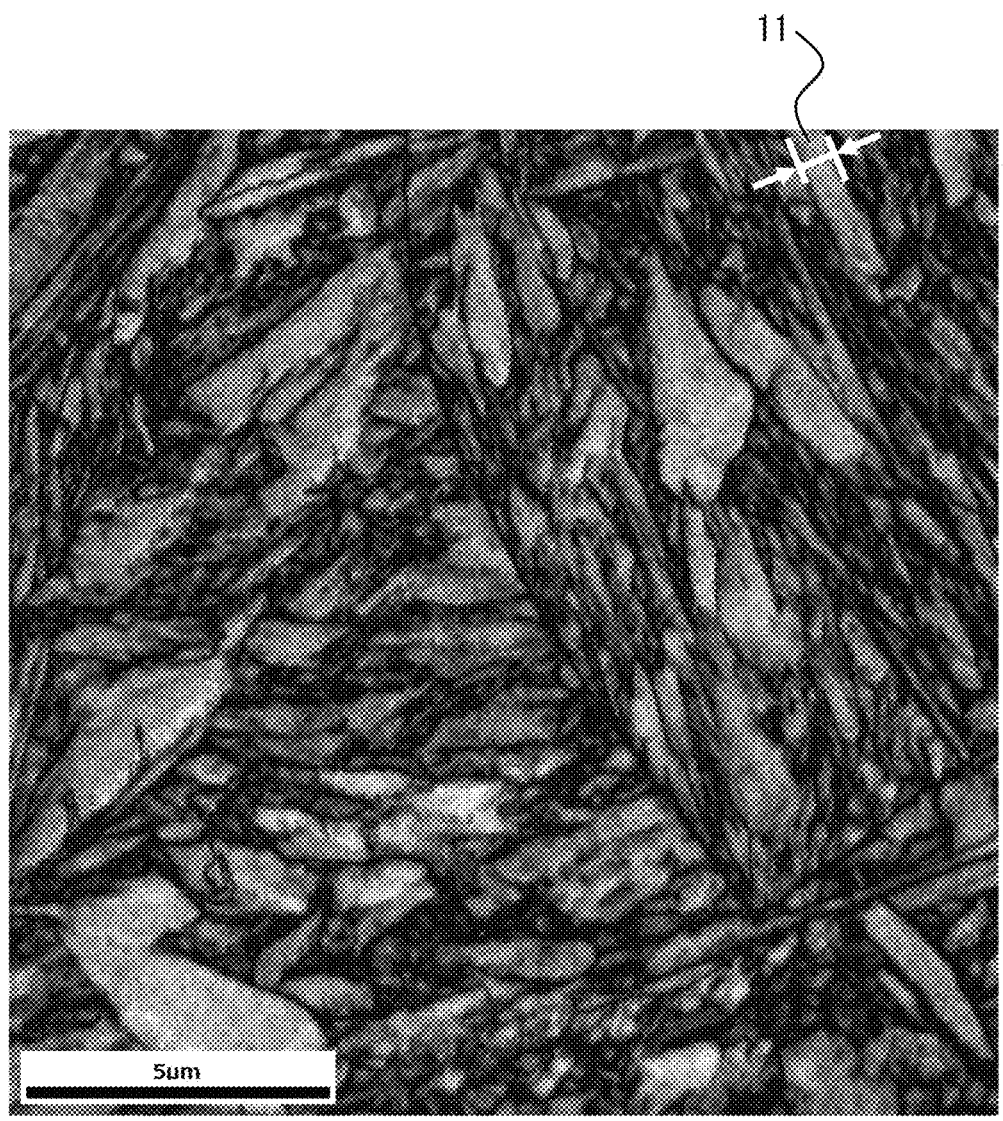
FIG. 6 is an SEM photograph showing a martensite structure in a square area of a spot welded joint according to an invention example.
Figure 7:
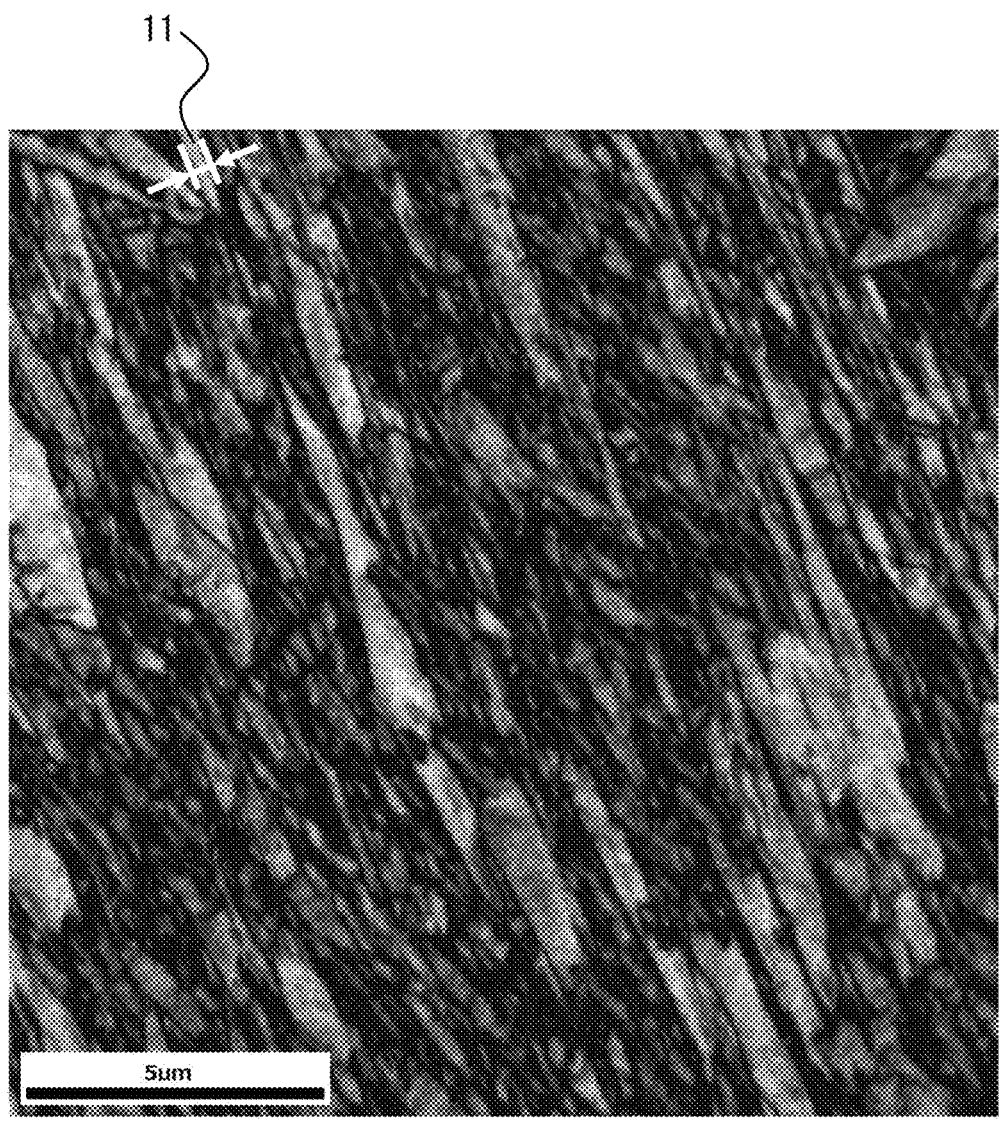
FIG. 7 is an SEM photograph showing a martensite structure in a square area of a spot welded joint according to a comparative example.

Further, a SEM photograph showing the martensite structure at a square area of the spot welded joint of an invention example of Sample No. 2 is shown in FIG. 6, while a SEM photograph showing the martensite structure at a square area of the spot welded joint of a comparative example of Sample No. 5 is shown in FIG. 7.

TABLE 2

| | | Heating step | | | Properties | | |
| | | Heat treatment | | | Block | | |
| Test no. | Combination of steel sheets | Temperature range | Holding time | Holding at Ms point or more | width average value [µm] | CTS [kN] | CTS improvement [%] |
|---|---|---|---|---|---|---|---|
| 1 | A-A | No later heat treatment | | | 0.3 | 5.2 | 100 |
| 2 | A-A | S | S | S | 2.1 | 10.8 | 208 |
| 3 | A-A | S | S | NS | 0.4 | 5.4 | 104 |
| 4 | A-A | S | NS | S | 0.3 | 5.7 | 110 |
| 5 | A-A | NS | S | S | 0.2 | 4.5 | 87 |
| 6 | A-A | S | NS | NS | 0.4 | 5.7 | 110 |
| 7 | B-C | No later heat treatment | | | 0.3 | 4.3 | 100 |
| 8 | B-C | S | S | S | 2.8 | 7.9 | 184 |
| 9 | B-C | NS | NS | S | 8.5 | 3.8 | 88 |
| 10 | D-D | No later heat treatment | | | 0.2 | 4.7 | 100 |
| 11 | D-D | S | S | S | 3.5 | 12.5 | 266 |
| 12 | D-D | S | NS | S | 0.4 | 5.8 | 123 |
| 13 | A-B-F | No later heat treatment | | | 0.4 | 5.7(AB interface) | 100 |
| 14 | A-B-F | S | S | S | 0.9 | 8.7 (AB interface) | 153 |
| 15 | A-F-B | No later heat treatment | | | 0.3(B) | 7.2(F-B interface) | 100 |

TABLE 2-continued

| Test no. | Combination of steel sheets | Heating step Heat treatment Temperature range | Holding time | Holding at Ms point or more | Block width average value [μm] | CTS [kN] | CTS improvement [%] |
|---|---|---|---|---|---|---|---|
|  |  |  |  |  | 0.4(A) | 8.5(F-A interface) | 100 |
| 16 | A-F-B | S | S | S | 4.5 | 12.5(F-B interface) | 174 |
|  |  |  |  |  | 3.8 | 15.8(F-A interface) | 186 |
| 17 | E-E | No later heat treatment |  |  | 0.3 | 3.7 | 100 |
| 18 | E-E | S | S | S | 3.5 | 8.9 | 241 |
| 19 | E-E | S | NS | S | 0.4 | 4.2 | 114 |
| 20 | F-B-F | No later heat treatment |  |  | 0.2 | 7.2(F-B interface) | 100 |
| 21 | F-B-F | S | S | S | 2.4 | 12.8(F-B interface) | 178 |
| 22 | F-B-F | S | NS | NS | 0.2 | 7.6(F-B interface) | 108 |

From Table 2, it could be confirmed that while the block widths in the square area of a spot welded joint which was not heat treated were small, as shown in FIG. 6, the block widths in the square area of a spot welded joint which was heat treated as prescribed by the present invention became large and, as a result, the CTS was greatly improved.

Further, it could be confirmed that even if performing heat treatment, if the heat treatment prescribed by the present invention was not satisfactory, the block widths became outside the scope of the present invention and as a result the rate of improvement of the CTS was not sufficient. Note that, Sample No. 9 had too large a size of the blocks deemed the units of fracture (average value of widths of blocks), so the fracture toughness fell. As a result, the CTS became lower than the reference.

INDUSTRIAL APPLICABILITY

According to the present invention, it is possible to obtain a spot welded joint sufficiently high in joint strength and high in reliability. Accordingly, the present invention has high industrial applicability in industries using spot welding as a manufacturing technique.

The invention claimed is:

1. A spot welded joint formed by superposing and spot welding a plurality of steel sheets, comprising:
at least one steel sheet of the plurality of steel sheets being a high strength steel sheet with a tensile strength of 750 MPa to 2500 MPa;
a carbon equivalent Ceq of the high strength steel sheet expressed by a following formula (A) is 0.20 mass % to 0.55 mass %,
wherein Ceq=[C]+[Si]/30+[Mn]/20+2[P]+4[S] (A), and
wherein [C], [Si], [Mn], [P], and [S] respectively are contents of C, Si, Mn, P, and S (mass %);
in the superposing of the plurality of steel sheets, the high strength steel sheet is arranged at an outermost side, the high strength steel sheet arranged at the outermost side being defined as a "high strength steel sheet S1",
a square area in a cross-section, the square area having an average value of the widths of blocks comprised of lath martensite being 0.5 to 7.0 μm, where the cross-section is cut along the sheet thickness direction of the plurality of steel sheets while passing through a center of a welding mark formed on the surface of the steel sheet due to the spot welding,
the square area SA is contained in a heat affected zone at said cross section having the high strength steel sheet S1 as a base material, has sides of 30 μm, and is centered about a crossing point of a line L2 and a line L3,
the line L2 is parallel to a tangent at any positon on a nugget end line NEL of a nugget and separated from the tangent by 250 μm to the heat affected zone,
the line L3 is vertical to the line L2 and passes through the positon,
the nugget end line NEL is a segment between a plane A and a plane B in a line indicating the end of the nugget,
the plane A is a superposed surface of the high strength steel sheet S1 and another steel sheet superposed with that high strength steel sheet S1,
the plane B is a plane passing through a point of one-half of a distance between a point E and a point O, and is parallel to the plane A,
the point E is a crossing point of a line L1 and a line indicating the end of the nugget at the high strength steel sheet S1 side,
the point O is a crossing point of the plane A and a line L1, and
the line L1 is a line in the sheet thickness direction passing through the center of the nugget.

2. A spot welded joint formed by superposing and spot welding a plurality of steel sheets, comprising:
at least one steel sheet of the plurality of steel sheets being a high strength steel sheet with a tensile strength of 750 MPa to 2500 MPa;
a carbon equivalent Ceq of the high strength steel sheet expressed by a following formula (A) is 0.20 mass % to 0.55 mass %,
wherein Ceq=[C]+[Si]/30+[Mn]/20+2[P]+4[S] (A); and
wherein in the formula (A), [C], [Si], [Mn], [P], and [S] respectively are contents of C, Si, Mn, P, and S (mass %),
in the superposing of the plurality of steel sheets, the high strength steel sheet is not arranged at an outermost side, the high strength steel sheet not arranged at the outermost side being defined as a "high strength steel sheet S1",
a square area in a cross-section, the square area having an average value of widths of blocks comprised of lath martensite being 0.5 to 7.0 μm, where the cross-section is cut along the sheet thickness direction of the plurality of steel sheets while passing through a center of a welding mark formed on the surface of the steel sheet due to the spot welding,
the square area SA is contained in a heat affected zone at said cross-section having the high strength steel sheet S1 as a base material, has sides of 30 μm and is centered about a crossing point of a line L2 and L3,
the line L2 is parallel to a tangent at any position on a nugget end line NEL of a nugget and separated from the tangent by 250 μm to the heat affected zone, and
the line L3 is vertical to the line L2 and passes through the position.

3. A spot welding method superposing and spot welding a plurality of steel sheets comprising:
at least one steel sheet of the plurality of steel sheets being a high strength steel sheet with a tensile strength of 750 MPa to 2500 MPa;
a carbon equivalent Ceq of the high strength steel sheet expressed by a following formula (A) is 0.20 mass % to 0.55 mass %,
wherein Ceq=[C]+[Si]/30+[Mn]/20+2[P]+4[S] (A), and
wherein [C], [Si], [Mn], [P], and [S] respectively are contents of C, Si, Mn, P, and S (mass %);
in the superposing of the plurality of steel sheets, the high strength steel sheet is arranged at an outermost side, the high strength steel sheet arranged at the outermost side being defined as a "high strength steel sheet S1",
the method comprising
providing the plurality of steel sheets;
a main welding step of supplying current to the superposed plurality of steel sheets through welding electrodes; and
a heating control step comprising, after the main welding step, maintaining the assembly at a temperature of the Ms point of the high strength steel sheet S1 or more while, in a square area SA in a cross-section, the square area having an average value of the widths of blocks comprised of lath martensite being 0.5 to 7.0 μm, where the cross-section is cut along the sheet thickness direction of the plurality of steel sheets while passing through a center of a welding mark formed on the surface of the steel sheet due to the main welding step, wherein
the square area SA is contained in a heat affected zone at said cross section having the high strength steel sheet S1 as a base material, has sides of 30 μm, and is centered about a crossing point of a line L2 and a line L3,
the line L2 is parallel to a tangent at any positon on a nugget end line NEL of a nugget and separated from the tangent by 250 μm to the heat affected zone,
the line L3 is vertical to the line L2 and passes through the positon,
the nugget end line NEL is a segment between a plane A and a plane B in a line indicating the end of the nugget,
the plane A is a superposed surface of the high strength steel sheet S1 and another steel sheet superposed with that high strength steel sheet S1,
the plane B is a plane passing through a point of one-half of a distance between a point E and a point O, and is parallel to the plane A,
the point E is a crossing point of a line L1 and a line indicating the end of the nugget at the high strength steel sheet S1 side,
the point O is a crossing point of the plane A and a line L1, and
the line L1 is a line in the sheet thickness direction passing through the center of the nugget;
a controlling step of controlling the square area contained in a heat affected zone having the high strength steel sheet S1 as a base material to be heated in a range of an Ar3 point [° C.] of the high strength steel sheet S1 to (Ar3 point+400)[° C.] for 0.04 second to 5.0 seconds.

4. A spot welding method superposing and spot welding a plurality of steel sheets comprising:
at least one steel sheet of the plurality of steel sheets being a high strength steel sheet with a tensile strength of 750 MPa to 2500 MPa;
a carbon equivalent Ceq of the high strength steel sheet expressed by a following formula (A) is 0.20 mass % to 0.55 mass %,
wherein Ceq=[C]+[Si]/30+[Mn]/20+2[P]+4[S] (A); and
wherein in the formula (A), [C], [Si], [Mn], [P], and [S] respectively being contents of C, Si, Mn, P, and S (mass %);
in the superposing of the plurality of steel sheets, the high strength steel sheet is not arranged at an outermost side, the high strength steel sheet not arranged at the outermost side being defined as a "high strength steel sheet S1",
the method comprising
providing the plurality of steel sheets;
a main welding step of supplying current to the superposed plurality of steel sheets through welding electrodes; and
a heating control step comprising, after the main welding step, maintaining the assembly at a temperature of the Ms point of the high strength steel sheet S1 or more while, in a square area in a cross-section, the square area having an average value of widths of blocks comprised of lath martensite being 0.5 to 7.0 μm, where the cross-section is cut along the sheet thickness direction of the plurality of steel sheets while passing through a center of a welding mark formed on the surface of the steel sheet due to the main welding step,
the square area SA is contained in a heat affected zone at said cross-section having the high strength steel sheet S1 as a base material, has sides of 30 μm and is centered about a crossing point of a line L2 and L3,
the line L2 is parallel to a tangent at any position on a nugget end line NEL of a nugget and separated from the tangent by 250 μm to the heat affected zone, and
the line L3 is vertical to the line L2 and passes through the position;
a controlling step of controlling the square area SA contained in a heat affected zone having the high strength steel sheet S1 as a base material to be heated in a range of an Ar3 point [° C.] of the high strength steel sheet S1 to (Ar3 point+400)[° C.] for 0.04 second to 5.0 seconds.

* * * * *